(12) United States Patent
Suzuki et al.

(10) Patent No.: US 7,506,632 B2
(45) Date of Patent: Mar. 24, 2009

(54) AIR-INTAKE DEVICE FOR INTERNAL COMBUSTION ENGINE

(75) Inventors: Hideki Suzuki, Chita-gun (JP); Katsuya Torii, Anjo (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/783,004

(22) Filed: Apr. 5, 2007

(65) Prior Publication Data

US 2007/0246009 A1  Oct. 25, 2007

(30) Foreign Application Priority Data

Apr. 25, 2006  (JP) ............... 2006-119956

(51) Int. Cl.
 *F02D 9/08* (2006.01)
 *F02D 9/16* (2006.01)
(52) U.S. Cl. ...................... 123/337; 123/403
(58) Field of Classification Search ................ 123/306, 123/308, 336, 337, 432, 442, 403
 See application file for complete search history.

(56) References Cited

U.S. PATENT DOCUMENTS

| | | | | |
|---|---|---|---|---|
| 4,308,830 A | * | 1/1982 | Yamada et al. | ............... 123/308 |
| 5,255,649 A | * | 10/1993 | Isaka | .................... 123/308 |
| 6,003,490 A | | 12/1999 | Kihara et al. | |
| 2006/0048738 A1 | | 3/2006 | Isaji et al. | |
| 2006/0048739 A1 | * | 3/2006 | Isaji et al. | ............... 123/184.56 |
| 2007/0227495 A1 | * | 10/2007 | Isaji et al. | .................... 123/306 |

FOREIGN PATENT DOCUMENTS

| | | |
|---|---|---|
| DE | 196 44 687 | 4/1998 |
| DE | 10 2005 050 508 | 4/2007 |
| JP | 07-269375 | 10/1995 |
| JP | 09-222063 | 8/1997 |

OTHER PUBLICATIONS

German Official Action dated Aug. 6, 2008, issued in counterpart German Application No. 10 2007 000 238.8-13 with English translation.

* cited by examiner

*Primary Examiner*—Mahmoud Gimie
(74) *Attorney, Agent, or Firm*—Nixon & Vanderhye PC

(57) ABSTRACT

An air-intake device includes a throttle valve pivotally movable around a shaft connected to one end of the throttle valve and an airflow passage formed in the intake air passage above an upper end of the throttle valve. In a region where an amount of intake air is small (i.e., in a region where an opening-degree of the throttle valve is small), an amount of intake air passing through the airflow passage is precisely controlled. In the same region, a high-speed airflow is generated in the airflow passage thereby to formulate a uniform air-fuel mixture in a combustion chamber of an internal combustion engine. These functions are easily realized by simply adding a member for forming the airflow passage to a throttle valve unit disposed in the intake air passage.

9 Claims, 14 Drawing Sheets

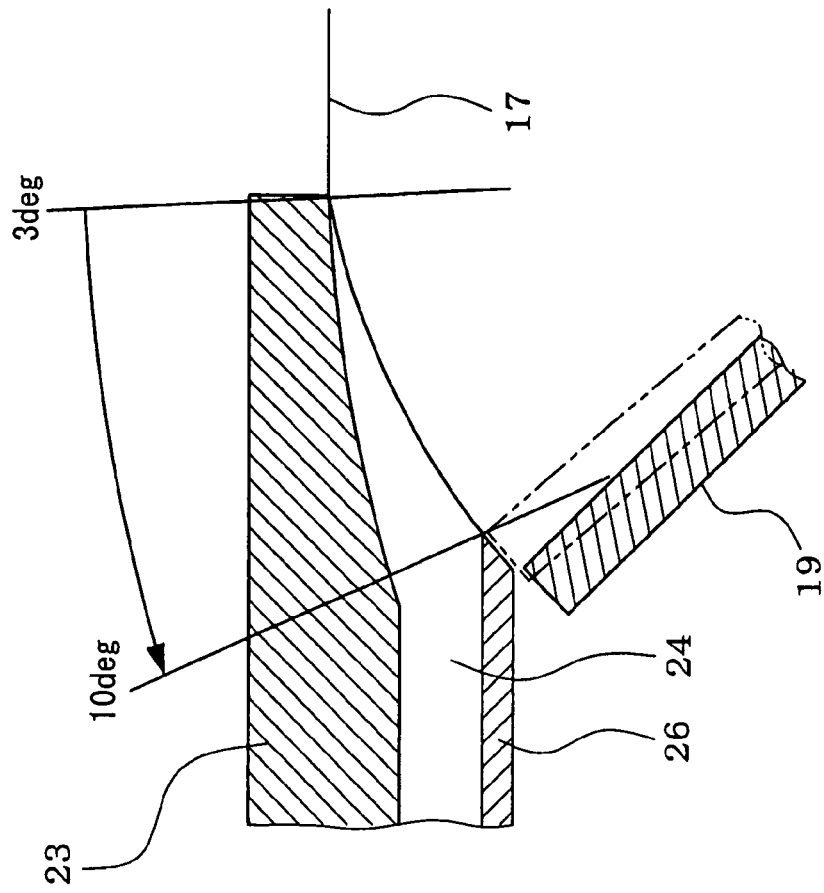
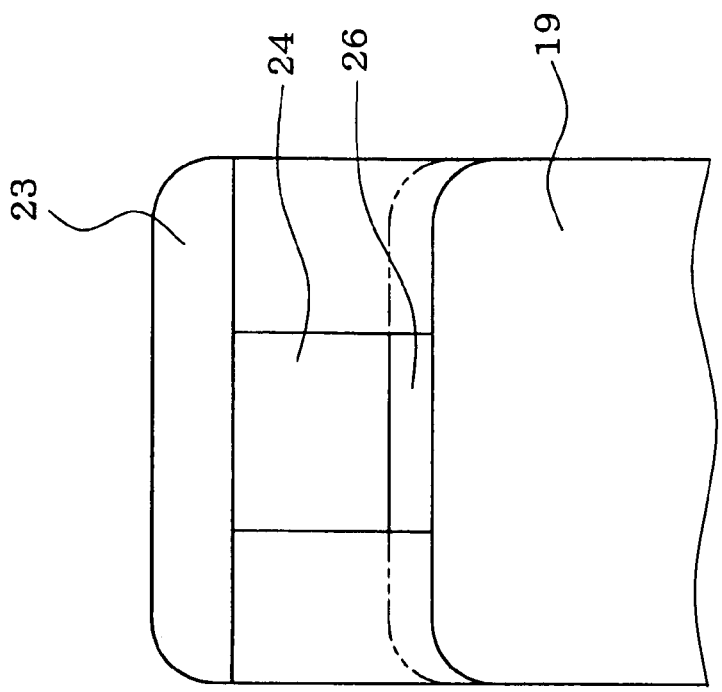
FIG. 14A
FIG. 14B

AIR-INTAKE DEVICE FOR INTERNAL COMBUSTION ENGINE

CROSS-REFERENCE TO RELATED APPLICATION

This application is based upon and claims benefit of priority of Japanese Patent Application No. 2006-119956 filed on Apr. 25, 2006, the content of which is incorporated herein by reference.

BACKGROUND OF THE INVENTION

1. Field of the Invention

The present invention relates to an air-intake device for an internal combustion engine, in which a function for adjusting an amount of an intake-air volume and a function for generating a desired air stream are included.

2. Description of Related Art

An example of an air-intake device is disclosed in JP-A-7-269375. In this device, a rotary-type throttle valve rotatable around a shaft supporting a diametric center of the throttle valve is disposed in an intake air passage. An amount of air supplied to an internal combustion engine is controlled according to an opening-degree of the rotary-type throttle valve. An additional air passage for a low air volume, corresponding to a region of a low opening-degree of the throttle valve, is provided at an upstream portion of the throttle valve in order to control an amount of air more precisely in a low air volume region. The rotary-type throttle valve in this device, however, does not generate a desired airflow directed toward an intake port of an engine cylinder. If it is necessary to generate the airflow, an airflow control valve has to be additionally provided at a downstream portion of the throttle valve, thereby increasing a manufacturing cost of the device.

Another example of this kind of device is proposed in JP-A-9-222063. In this device, an airflow control valve rotatable around its center axis is provided downstream of a throttle valve that controls an amount of air supplied to an engine. Further, a guide-groove for generating a high speed airflow when the airflow control valve is closed is provided along a wall of an intake air passage. The airflow control valve and the guide-groove in this device, however, do not has a function for precisely controlling an amount of air at a low air volume region though the airflow is generated. Further, since the airflow control valve is rotatable around its center axis, air also flows through an opening formed at an opposite side of the guide-groove when the airflow control valve is opened. Accordingly, the guide-groove cannot generate a desired airflow effectively.

A conventional throttle valve is usually made rotatable around its center axis, and intake air flows though openings at both sides of the throttle valve when it is opened. Therefore, it is difficult to precisely control an amount of intake air at a region where a volume of the intake air is low.

SUMMARY OF THE INVENTION

The present invention has been made in view of the above-mentioned problem, and an object of the present invention is to provide an improved air-intake device for an internal combustion engine, in which an amount of intake air is precisely controlled at its low volume region while providing a function for generating a desired airflow toward an intake port. Another object of the present invention is to provide such a device at a low cost.

The air-intake device includes a throttle valve unit disposed in an intake air passage of an internal combustion engine. The throttle valve unit is composed of a housing, a throttle valve disposed in the housing and a member for forming an airflow passage. A lower end of the throttle valve is connected to the intake air passage so that it pivotally rotates around a shaft thereby to change an open area between an upper end of the throttle valve and inner wall of the intake air passage.

The throttle valve takes a fully closed position when it becomes perpendicular to a center line of the intake air passage and takes a fully closed position when it becomes parallel to the center line. An opening-degree of the throttle valve is zero at its fully closed position and 90 degrees at its fully open position. In a predetermined region of the opening-degree of the throttle valve (where a small amount of intake air is supplied), an amount of intake air flowing through the airflow passage is precisely controlled, and at the same time an airflow having a high speed is generated in the airflow passage thereby to promote formation of uniform air-fuel mixture in a combustion chamber of the engine.

The predetermined region of the opening-degree of the throttle valve may be set so that an amount of intake air taken in that region is equal to or higher than an amount required at an warming-up idling operation of the engine and equal to or lower than an amount required for driving at a constant high speed on a flat road.

The airflow passage may be made in a tunnel-shape covered by a cover wall to reduce airflow attenuation in the passage. The tunnel-shaped passage may be branched out to form plural branch passages, each corresponding to each intake valve provided in a cylinder of the engine. An outlet port of the tunnel-shaped passage or the tunnel-shaped branch passage may be inclined so that the airflow is directed to the inlet valve. An entrance fringe of the cover wall may be slanted, curved or bent thereby to eliminate an insensitive region where an amount of intake air does not change according to the opening-degree of the throttle valve. A swollen or projected member may be formed on a rear surface of the throttle valve to prevent turnaround airflow from the front surface to the rear surface of the throttle valve. The member for forming the airflow passage may be made separately from other components of the air-intake device, so that existing device is easily modified by installing the separately made member.

According to the present invention, an amount of intake air is precisely controlled in a region where an intake air volume is low. A high-speed airflow is generated in the same region to formulate a uniform air-fuel mixture in a combustion chamber. These functions are easily provided by simply adding the member for forming the airflow passage to the throttle valve unit. Other objects and features of the present invention will become more readily apparent from a better understanding of the preferred embodiments described below with reference to the following drawings.

BRIEF DESCRIPTION OF THE DRAWINGS

FIGS. 14A and 14B are drawings for explaining an insensitive region where an amount of intake air does not change according to an opening-degree of the throttle valve;

DETAILED DESCRIPTION OF THE PREFERRED EMBODIMENTS

Figure 1:
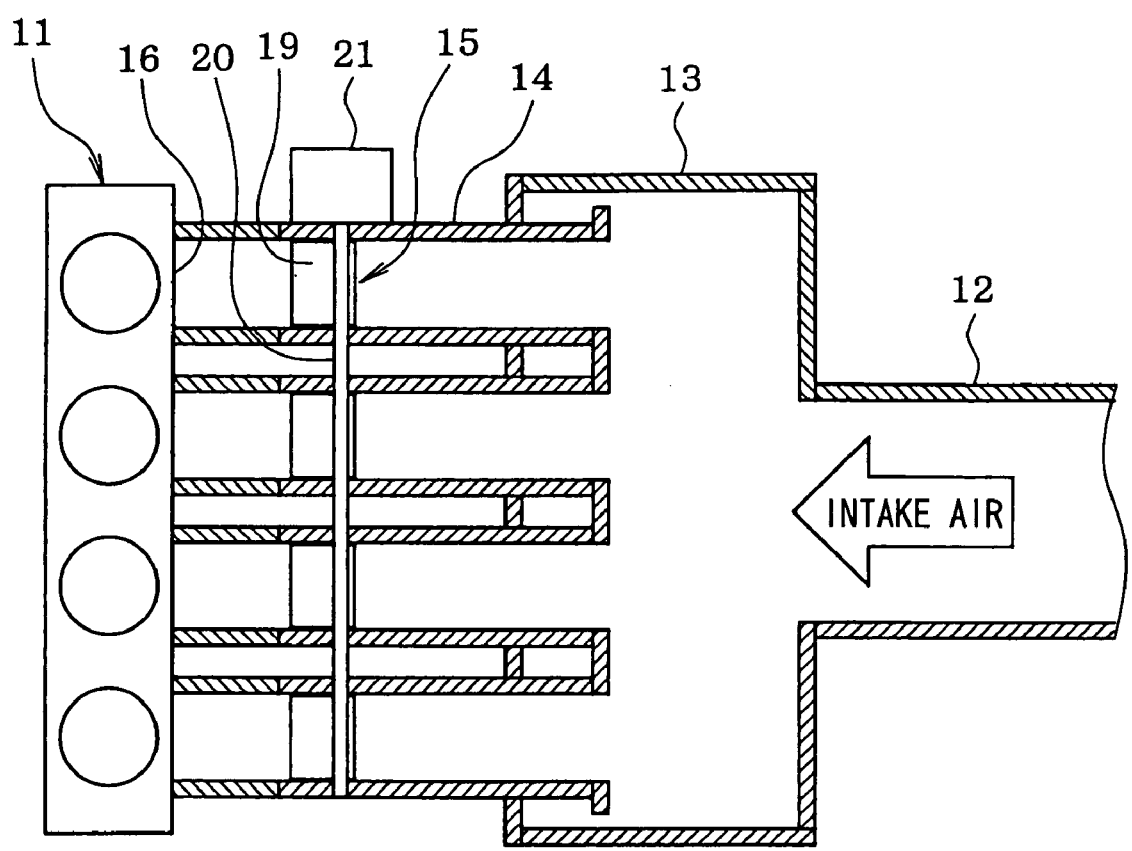
FIG. 1 is a cross-sectional view showing an entire structure of an air-intake device of an internal combustion engine.

A first embodiment of the present invention will be described with reference to FIGS. 1-6. Referring to FIG. 1, an entire structure of an air-intake device will be described. Intake air is supplied to each cylinder of an internal combustion engine 11 through an intake pipe 12, a surge tank 13 and intake manifold 14, connected in this order from an upstream end of the intake air. A throttle valve unit 15 is disposed in each manifold pipe connected to each cylinder of the engine 11. A fuel injector (not shown) for injecting fuel toward an intake port 16 of each cylinder is disposed downstream of the throttle valve unit 15. A spark plug for igniting mixture gas is installed in each cylinder head of the engine 11. A throttle valve 19 of each throttle valve unit 15 are connected to a common shaft 20 that is driven by a motor 21.

Figure 2:
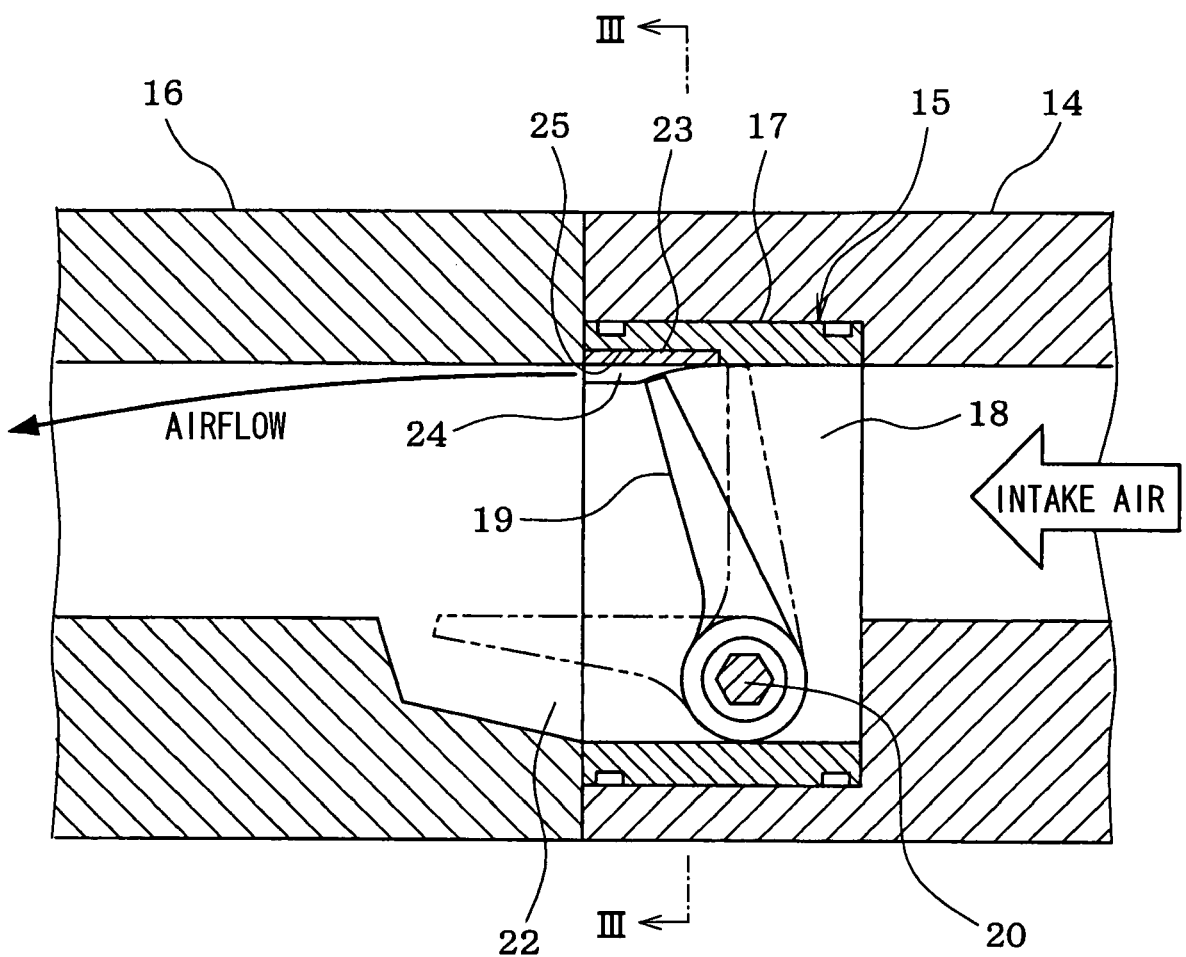
FIG. 2 is a cross-sectional view showing a throttle valve disposed in an intake air passage, as a first embodiment of the present invention.
Figure 3:
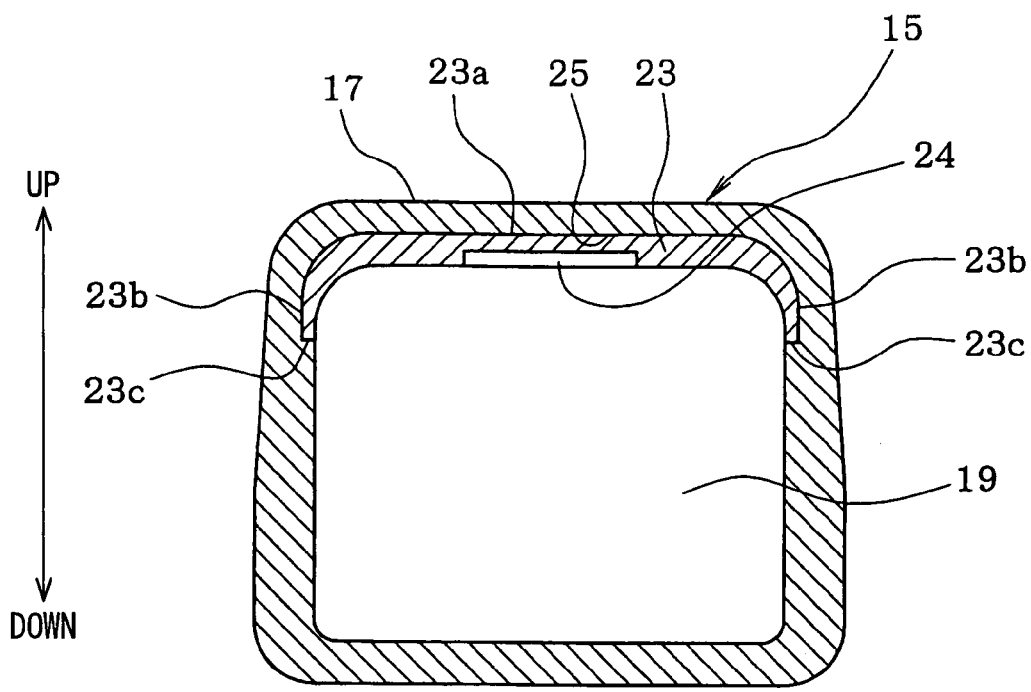
FIG. 3 is a cross-sectional view showing a member for forming an airflow passage, taken along line III-III shown in FIG. 2.

Now, referring to FIGS. 2-6, the throttle valve unit 15 will be described in detail. As shown in FIGS. 2 and 3, the throttle valve unit 15 is composed of a housing 17 made of resin, a throttle valve 12 pivotally supported by a shaft 20, and a member 23 for forming an airflow passage 24. The throttle valve unit 15 is disposed in a depressed portion 25 of the intake manifold 14. The housing 17 has an intake air passage 18 having a square cross-section, and the intake air passage is closed or opened by the throttle valve 19. The cross section of the housing is not limited to a square shape, but it could be other shapes such a half circular or a half-oval shape. The throttle valve 19 is connected to the common shaft 20 supported in the intake manifold 14 (FIG. 1). As shown in FIG. 2, the throttle valve 19 is connected to the shaft 20 at its lower end so that it pivotally moves around the shaft 20.

The shaft 20 common to all throttle valves 19 is driven by the motor 21, and thereby an opening-degree of the throttle, i.e., an amount of air supplied to the engine, is controlled according to operating conditions of the engine. It is also possible to connect the shaft 20 to an accelerator pedal to be driven thereby. When the throttle valve 19 is closed, an upper end of the throttle valve 19 is very close to the upper wall of the housing 17 (almost contacting) so that no air passes therethrough. The throttle valve 19 is so made that no air passes through a space between the bottom end of the throttle valve 19 and a lower wall of the housing 17. A depressed portion 22 is formed in the intake manifold 14, so that the throttle valve 19 is accommodated in the depressed portion 22 not to disturb airflow when the throttle valve 19 is fully closed, as shown with dotted line in FIG. 2.

Figure 4:
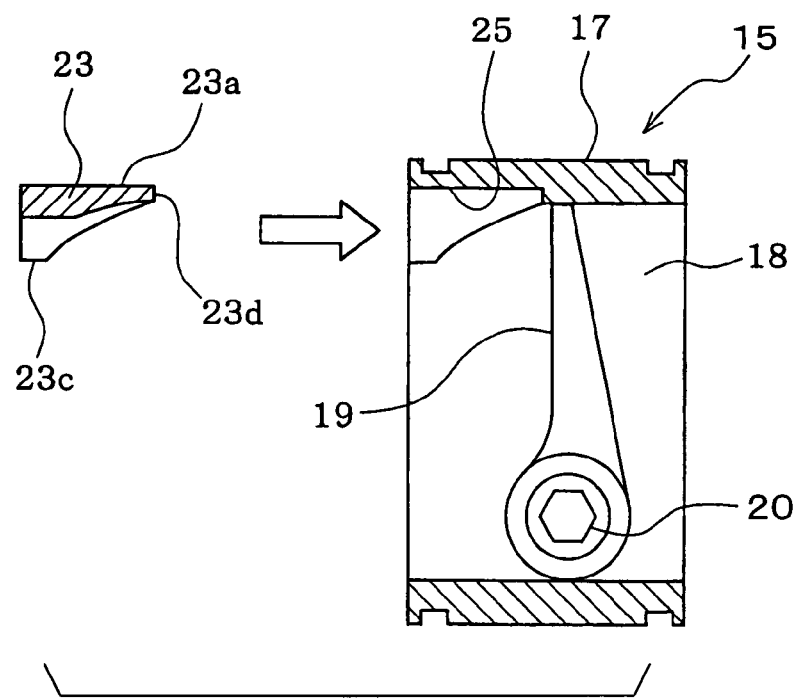
FIG. 4 is a cross-sectional view showing a throttle valve unit and a member for forming an airflow passage to be coupled to the throttle valve unit.

As shown in FIGS. 2 and 3, a member 23 having a U-shaped cross-section is disposed in a depressed portion 25 positioned downstream of the throttle valve 19. The member 23 forms an elongated airflow passage 24 therein, so that a speed of airflow passing through the passage 24 is increased for forming a uniform mixture in the cylinder. As shown in FIG. 4, the member 23 is formed separately from the housing 17 and connected to the depressed portion 25 of the housing 17. The member 23 is disposed in the depressed portion 25 so that an upper surface 23a, side surfaces 23b, lower ends 23c and a front end 23d closely contact the housing 17, respectively. The member 23 is connected to the housing 17 by press-fitting or with adhesive.

Figure 5A:
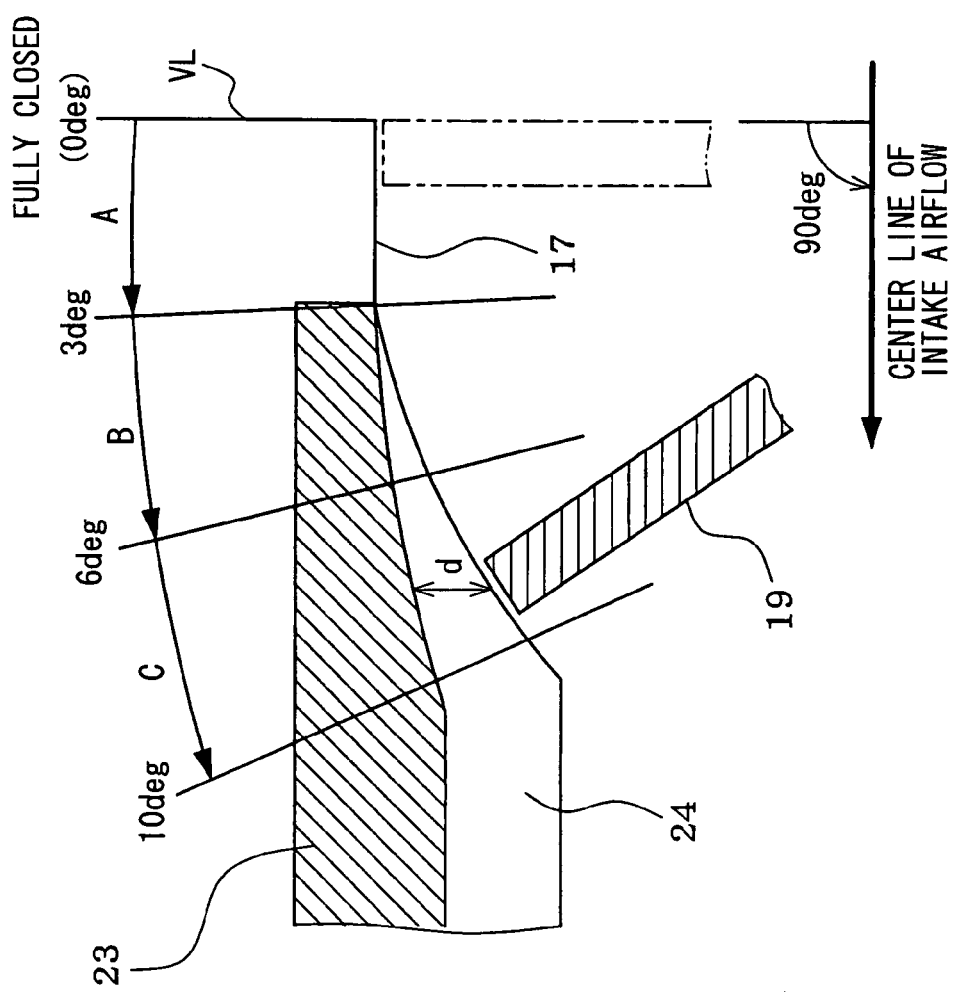
FIG. 5A is a cross-sectional view showing a position of the throttle valve relative to the member for forming an airflow passage in an enlarged scale.
Figure 5B:
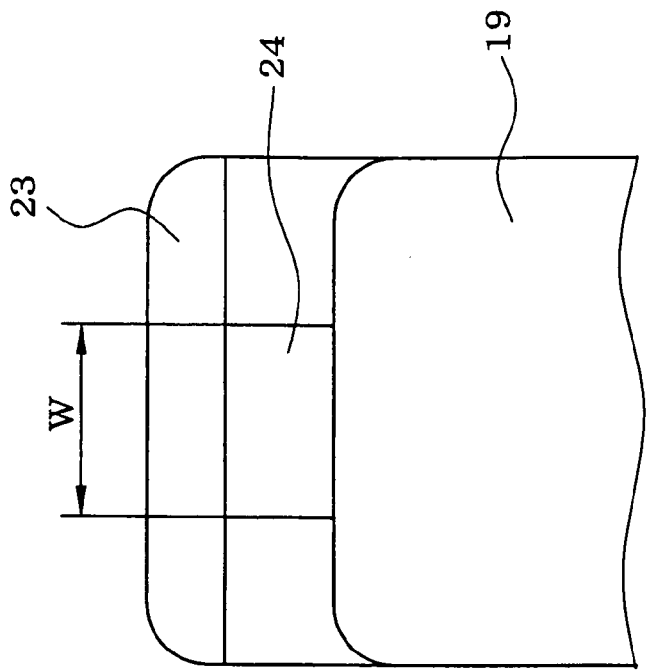
FIG. 5B is a front view of FIG. 5A showing the throttle valve and the member for forming an airflow passage.

With reference to FIGS. 5A and 5B, an opening degree of the throttle valve 19 will be described. As shown in FIG. 5A, the throttle valve 19 takes a fully closed position when an angle made between a vertical line VL (that is perpendicular to a center line of an intake airflow) and the throttle valve is 0°, while the throttle valve 19 takes a fully closed position when that angle is 90° (when the throttle valve 19 becomes parallel to the center line of the intake airflow). The opening-degree of the throttle valve 19 is defined as zero at the fully closed position. In a region, where the opening-degree is about 3° to 10° (this region is referred to as a low air volume region), the upper wall of the airflow passage 24 is made in an arc-shape so that a gap between the upper wall of the airflow passage 24 and the upper end of the throttle valve 19 gradually increases as the opening-degree increases. By disposing the member 23 for forming the airflow passage 24 in the housing 17, a volume of the intake air is decreased in the low air volume region, and the volume of the intake air is more precisely controlled in this region. The gap between the inner wall of the housing 17 and the upper end of the throttle valve 19 is made very small at the fully closed position, e.g. 50 μm.

Figure 6:
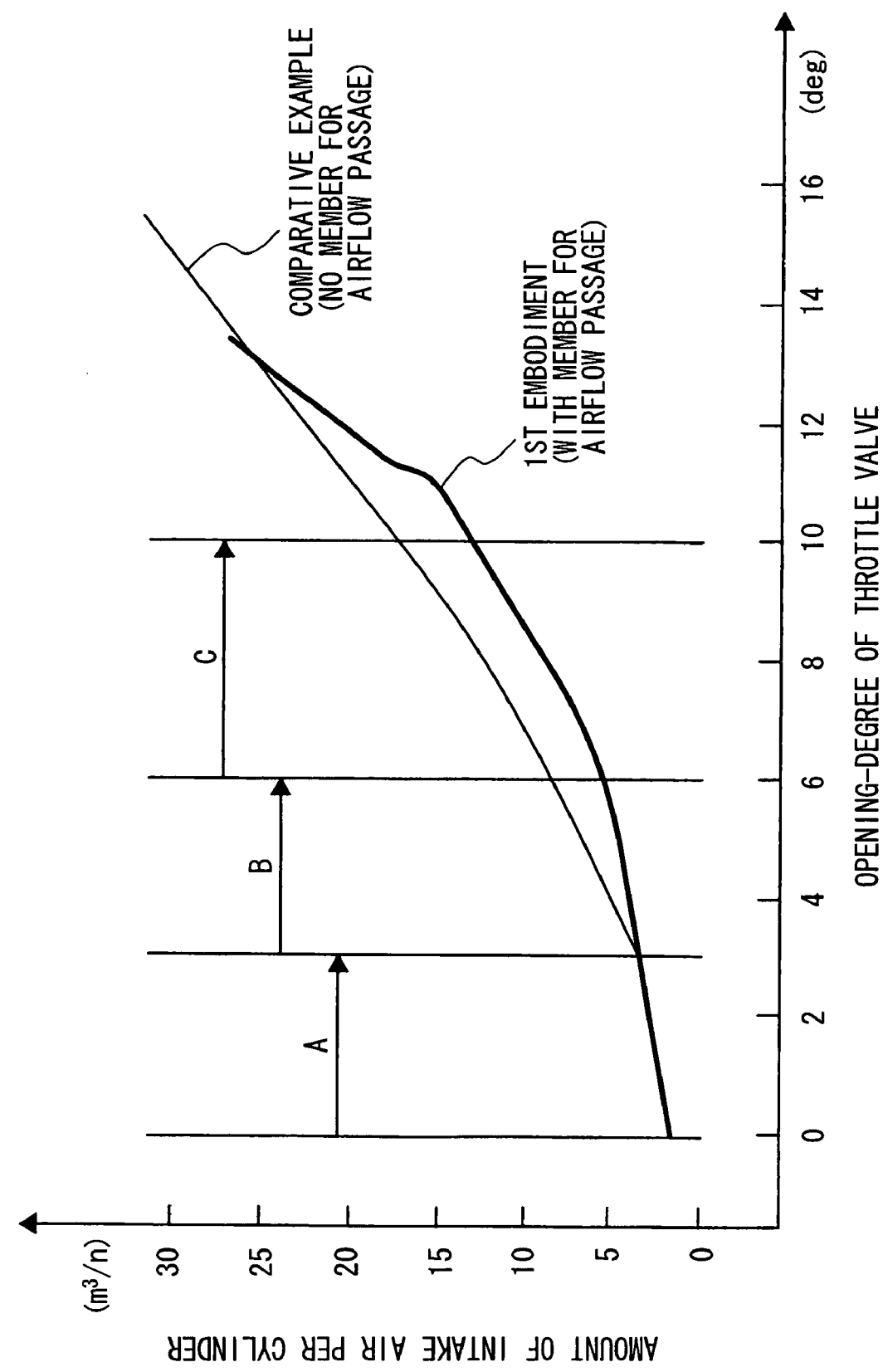
FIG. 6 is a graph showing an amount of intake air supplied to a cylinder of an engine relative to an opening-degree of the throttle valve.

As shown in FIG. 5A, in a region "A" where the opening-degree is 0°-3°, the gap (that corresponds to an amount of the intake air passing through the throttle valve 19) increases linearly. The upper end of the throttle valve 19 meets an inlet of the airflow passage 24 at the opening-degree 3°. FIG. 6 shows the amount of the intake air relative to the opening-degree of the throttle valve 19. In the region "A", the amount of the intake air increases linearly. In the region "A", the engine is operated at a speed lower than a warming-up idling speed that is 200 rpm higher than a normal idling speed. The normal idling speed is a speed at which the engine is operated after it is warmed up. In the region "A", the airflow is not positively generated, suppressing a pumping loss that causes an increase in fuel consumption.

In a region "B" where the opening-degree is 3°-6° and a region "C" where the opening-degree is 6°-10°, a cross-sectional area of the airflow passage 24 (i.e., its width W×depth d) becomes gradually large according to an increase in the opening-degree. The amount of the intake air gradually increases as shown in FIG. 6, and the airflow is rectified in the passage 24 while increasing its flow speed at the same time. In this manner, a desirable airflow that forms a uniform mixture in a combustion chamber is generated.

In the region "B", an amount of intake air required at a warming-up speed (a so-called fast idling speed for a cold engine) is supplied to the engine. A changing rate of an amount of the intake air relative to increase in the opening-degree of the throttle valve 19 is smaller in the region "B" than that in the region "C". In the region "C", an amount of intake air required in a high speed drive on a flat road (e.g., 120 km/h) is supplied to the engine. In a region beyond the region "C", an amount of intake air becomes the same as that of an comparative example, in which no airflow passage is formed, as shown in FIG. 6. In other words, in a region beyond the region "C", the amount of intake air increases according to the opening-degree of the throttle valve 19.

As explained above, in the region "B" corresponding to the warming-up idling and the region "C" corresponding to the high speed drive on a flat road, a high speed airflow is generated in the airflow passage 24. Therefore, an amount of fuel adhering to an inside wall of the intake port at the warming-up idling speed is reduced, and combustion in the engine is stabilized by forming a uniform mixture. Further, an amount of EGR (Exhaust Gas Recirculation) can be increased without worsening fuel economy and a pumping loss can be reduced because the uniform mixture is formed in the combustion chamber by means of the airflow generated in the airflow passage 24. In the present invention, a predetermined region of the opening-degree of the throttle valve is set to cover the regions B and C. In other words, the predetermined region of the opening-degree of the throttle valve corresponds to an engine speed from the warming-up idling speed (e.g., 200 rpm higher than the normal idling speed) to a high driving speed on a flat road (e.g., 120 km/h).

Though the throttle valve 19 takes the fully closed position at its opening-degree 0° in the embodiment described above, it is possible to set the fully closed position at the opening-degree 3°-6°, which is usually adopted. This setting is appropriate to a small engine having a small area of the throttle valve because an amount of intake air relative to the opening-degree of the throttle valve becomes large in this setting. The upper limit of the region "B" and region "C" could be increased up to 18° and 30°, respectively, according to an area of the throttle valve 19 and a cross-sectional area of the airflow passage 24.

Advantages attained in the first embodiment described above will be summarized below. In the predetermined region where an amount of intake air is low (i.e., in the regions B and C), the amount of intake air is precisely controlled, and an airflow for formulating a uniform mixture in the combustion chamber is generated. These advantages are attained by providing the airflow passage 24 in the intake air passage.

Since the throttle valve 19 that pivots around the shaft 20 connected to its bottom end is used, the amount of intake air is controlled only by changing an air passage above the throttle valve 19. Accordingly, the amount of intake air is precisely controlled in the region where a small amount of intake air is required. Since the member 23 for forming the airflow passage 24 is manufactured separately from other parts such as the throttle valve 19 and the housing 17 and is installed in the depressed portion 25 of the housing 17, it is easy to change characteristics of the airflow passage 24 without changing other parts. In other words, the amount of intake air and the airflow speed in the airflow passage 24 in the predetermined region (the regions B and C) can be easily changed only by changing the member 23 for forming the airflow passage.

Figure 7:
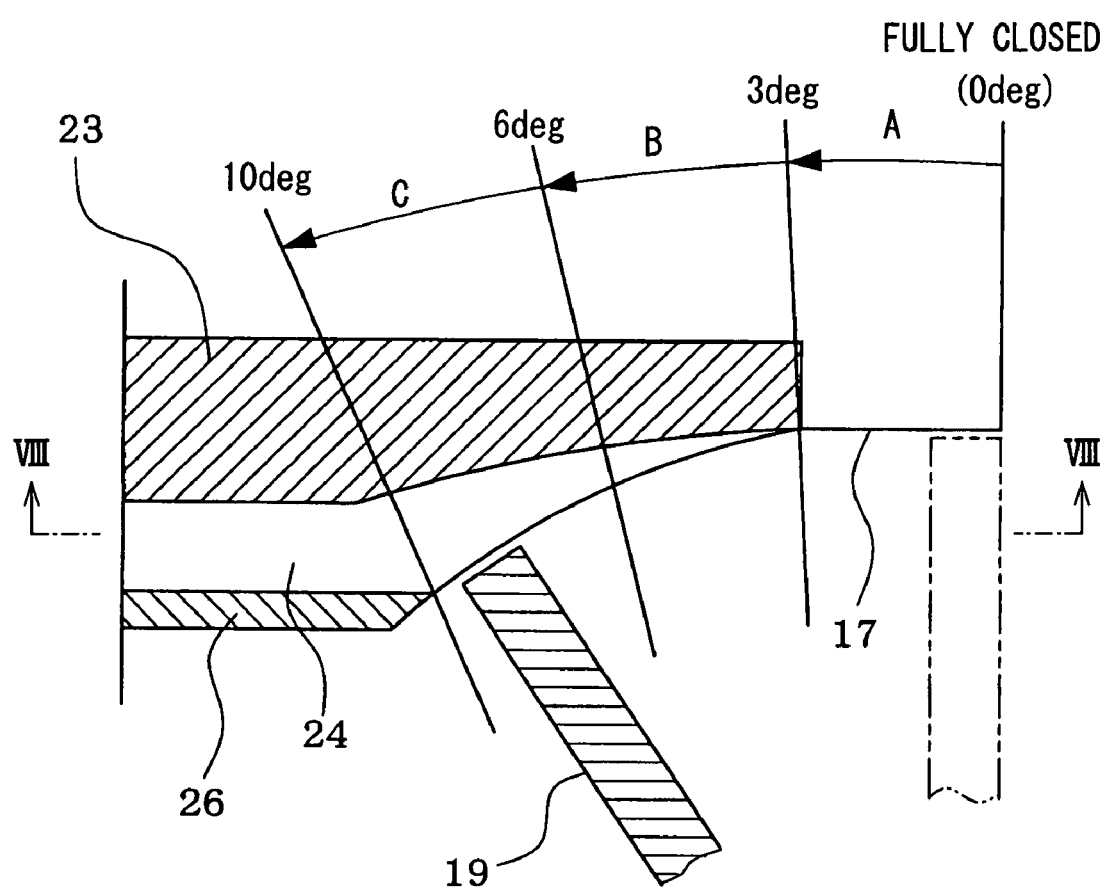
FIG. 7 is a cross-sectional view showing a position of the throttle valve relative to a member for forming an airflow passage, as a second embodiment of the present invention.

A second embodiment of the present invention will be described with reference to FIGS. 7-11. In this embodiment, the airflow passage 24 is covered by a cover wall 26, thereby forming a tunnel-shaped passage 24, as shown in FIG. 7. Other structures are the same as those of the first embodiment. By making the tunnel-shaped airflow passage 24, the airflow can reach a combustion chamber even if a distance from the airflow passage 24 to the combustion chamber is long. In other words, attenuation of the airflow in the airflow passage 24 is suppressed by forming the passage 24 in a tunnel-shape.

Figure 8:
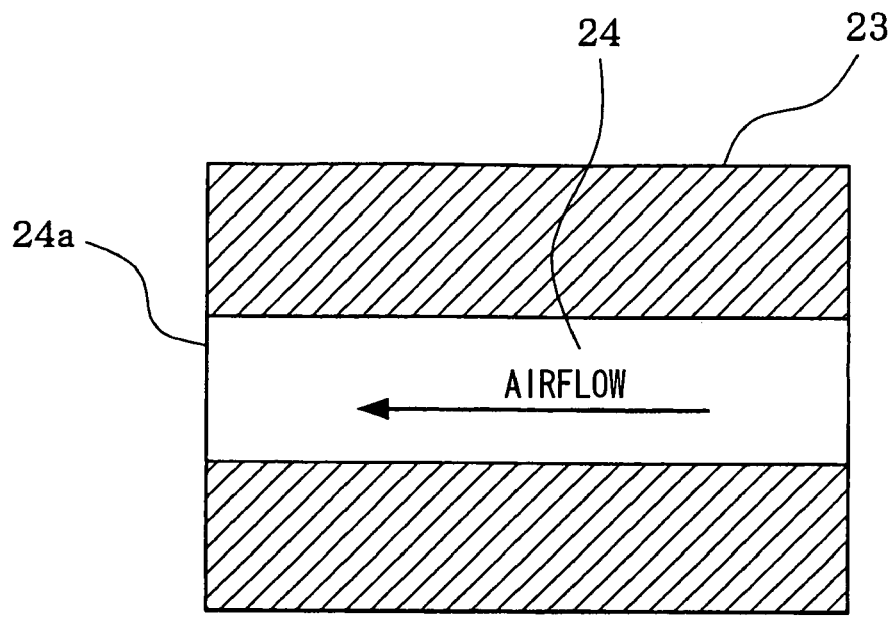
FIG. 8 is a cross-sectional view showing the member for forming an airflow passage, taken along line VIII-VIII shown in FIG. 7.
Figure 9:
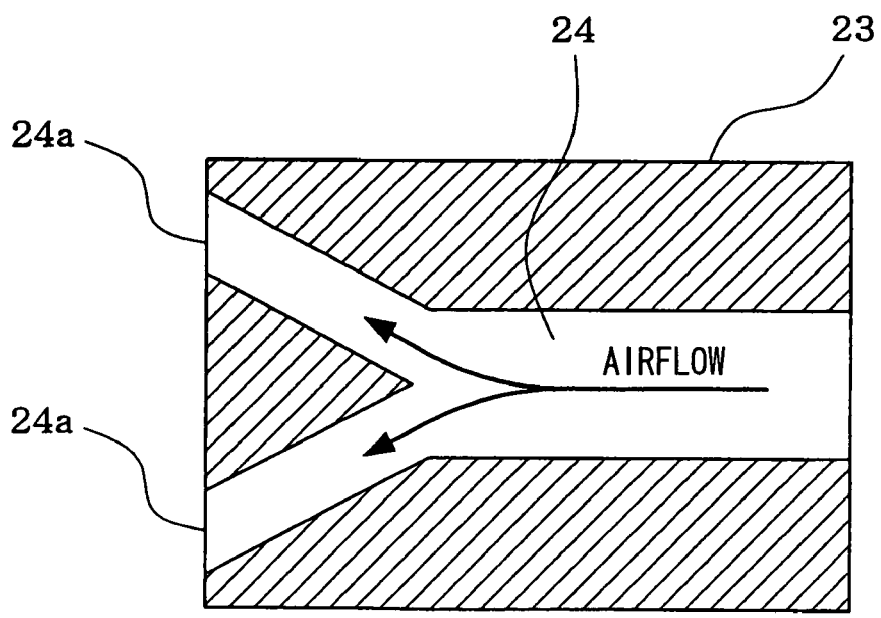
FIG. 9 is a cross-sectional view showing a member for forming an airflow passage, as a modified form of the second embodiment.
Figure 10:
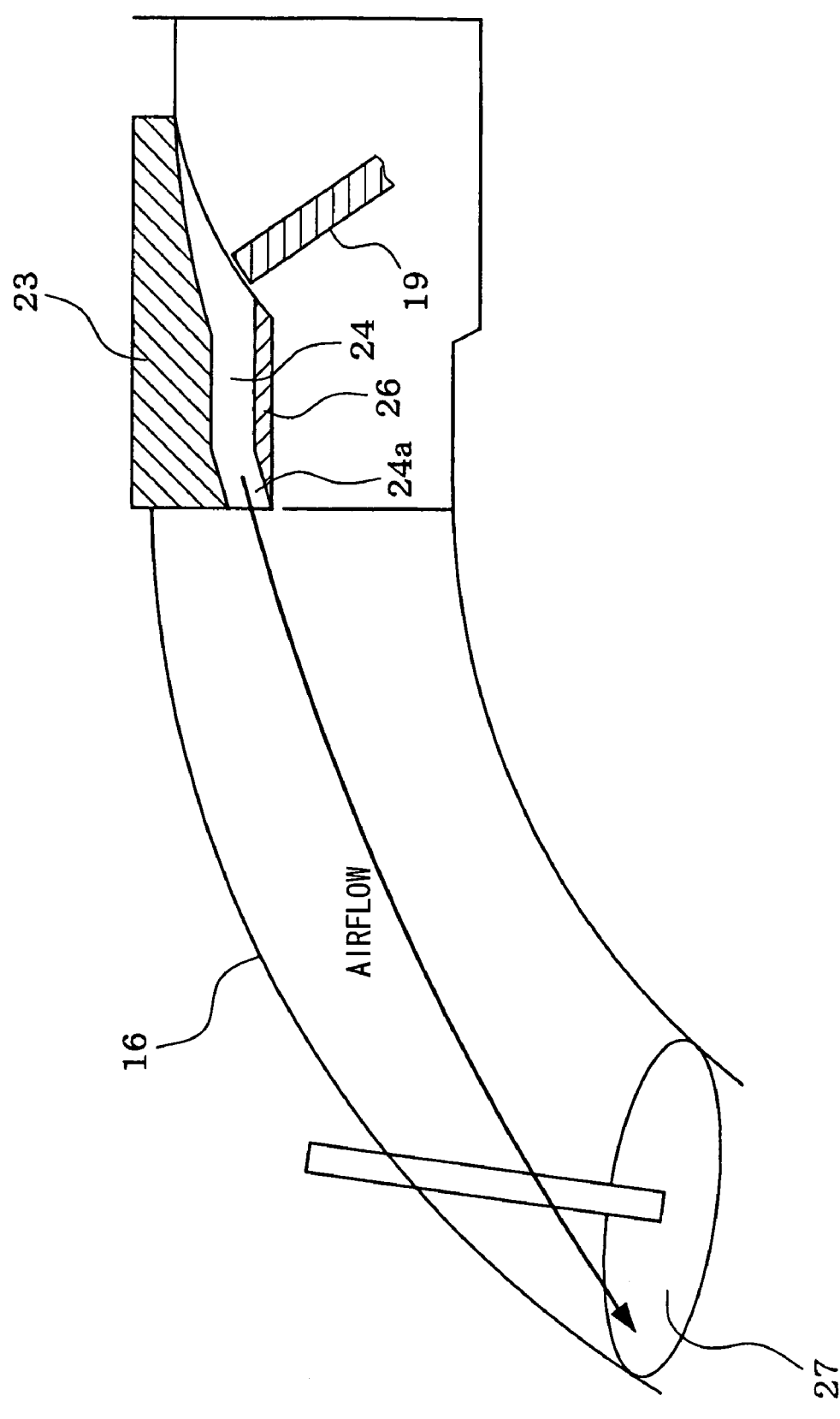
FIG. 10 is a schematic view showing a direction of an airflow generated in the airflow passage.
Figure 11:
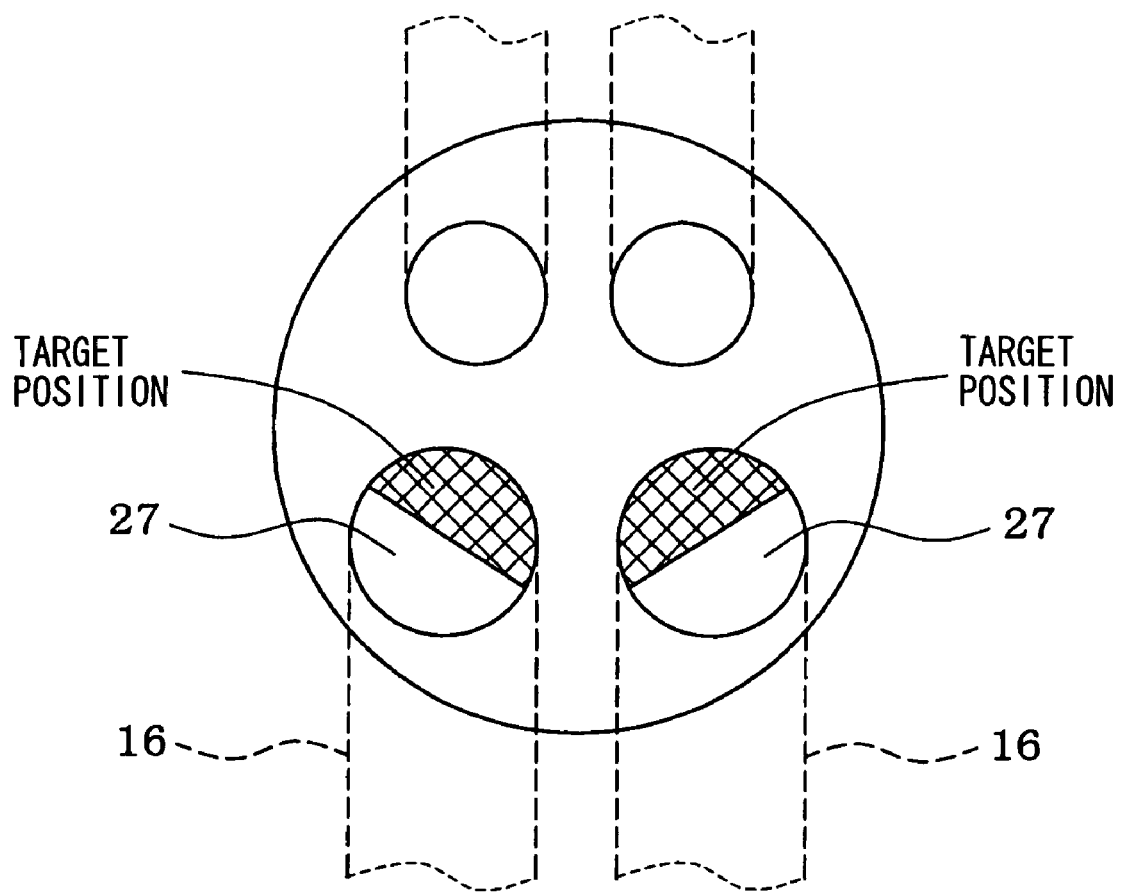
FIG. 11 is a schematic view showing target positions to which the airflow generated in branch airflow passages is directed.

The tunnel-shaped airflow passage 24 may be formed as a single passage, as shown in FIG. 8. Alternatively, it may be branched out to form two branch passages, as shown in FIG. 9. The branch passages extend toward respective outlet ports 24a that are directed to respective intake valves 27 (refer to FIG. 10) of a cylinder of the engine. The number of branch passages is not limited to two, but the number may be equal to the number of intake valves 27 provided in each cylinder. As shown in FIG. 10, the outlet port 24a of the branch passage may be slanted or curved so that the airflow passing through the branch passage 24 is directed to the intake valve 27. In this manner, attenuation in the airflow is suppressed. As shown in FIG. 11, a target position may be set on the intake valve 27, and the airflow passing through the branch passage may be directed to the target position. For example, the target position on each intake valve 27 may be set at a position close to a center of the combustion chamber.

The following advantages are attained in the second embodiment in addition to the advantages attained in the first embodiment. Since the airflow passage 24 is made in the tunnel-shape, attenuation of the airflow is suppressed. Accordingly, the airflow can reach the combustion chamber even if a distance to the combustion chamber is long. Since the airflow is directed to each intake valve 27 by branching out the airflow passage 24, the airflow is equally distributed to each intake valve 27, thereby forming a uniform mixture in the combustion chamber. Since the outlet port 24a of each branch passage 24 is slanted or curved, the airflow is surely directed toward each intake port and smoothly introduced into the combustion chamber.

Figure 12A:
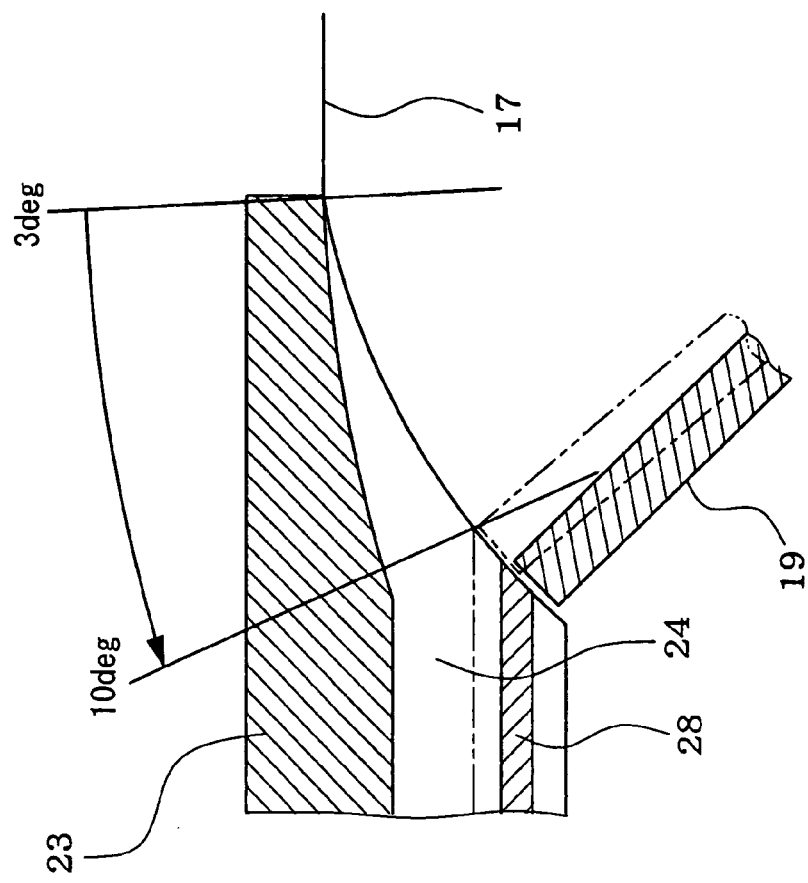
FIG. 12A is a cross-sectional view showing a member for forming an airflow passage and a throttle valve, as a third embodiment of the present invention.

A third embodiment of the present invention will be described with reference to FIGS. 12-14. As shown in FIGS. 14A and 14B, in the case where an entrance fringe of the cover wall 26 is formed in parallel to the shaft 20 (i.e., in parallel to the upper end of the throttle valve 19), an insensitive region, where an amount of intake air does not change in response to changes in the opening-degree of the throttle valve 19, is formed. This insensitive region is the region where the upper end of the throttle valve 19 faces the entrance fringe of the cover wall 26, as shown in FIG. 14A.

Figure 12B:
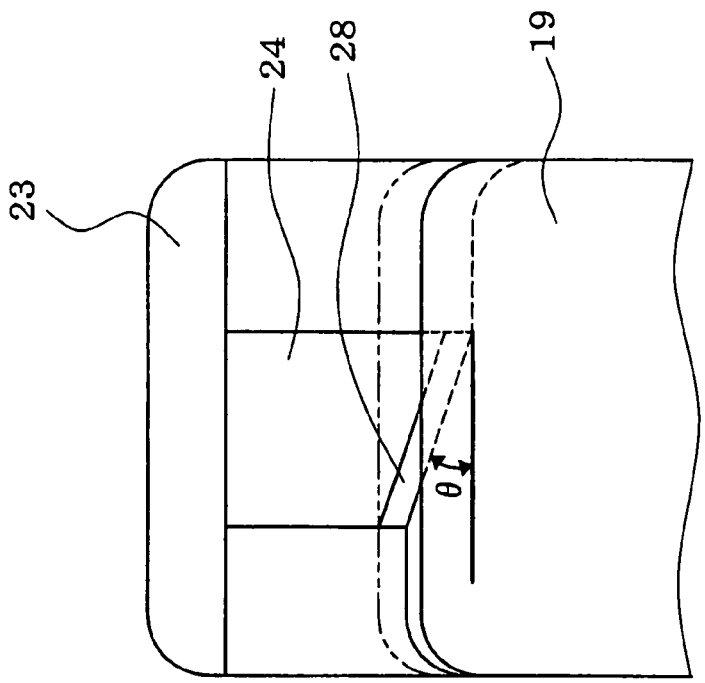
FIG. 12B is a front view of FIG. 12A showing the throttle valve and the member for forming an airflow passage.
Figure 13A:
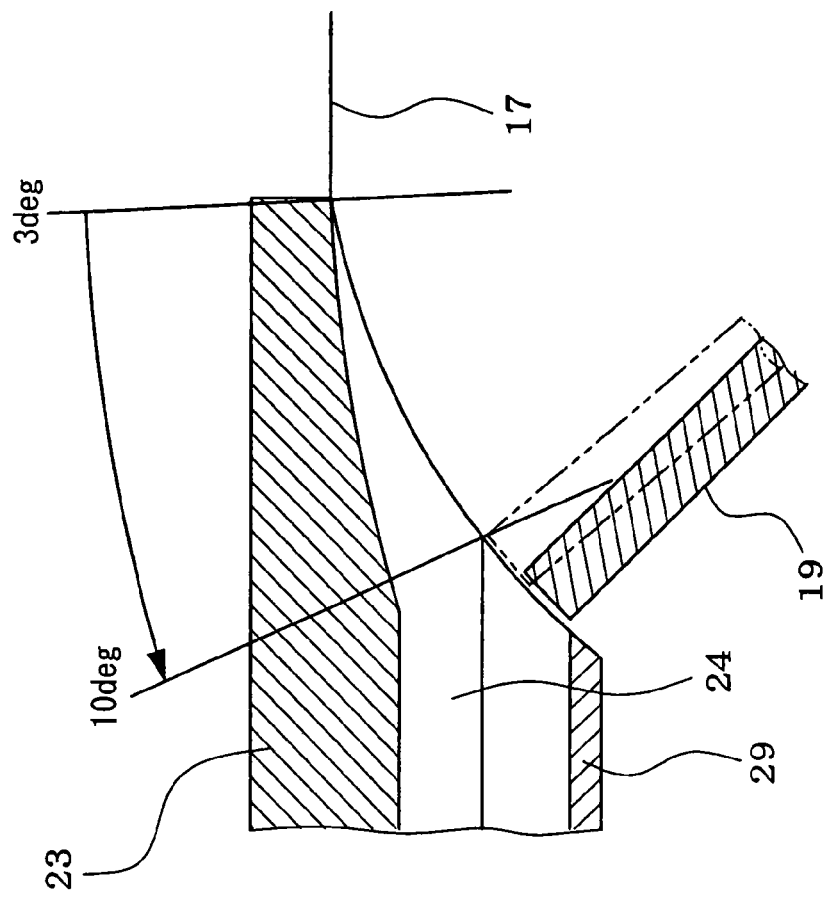
FIGS. 13A and 13B (corresponding to FIGS. 12A and 12B) are a cross-sectional view and a front view, respectively, showing a modified form of the third embodiment.
Figure 13B:
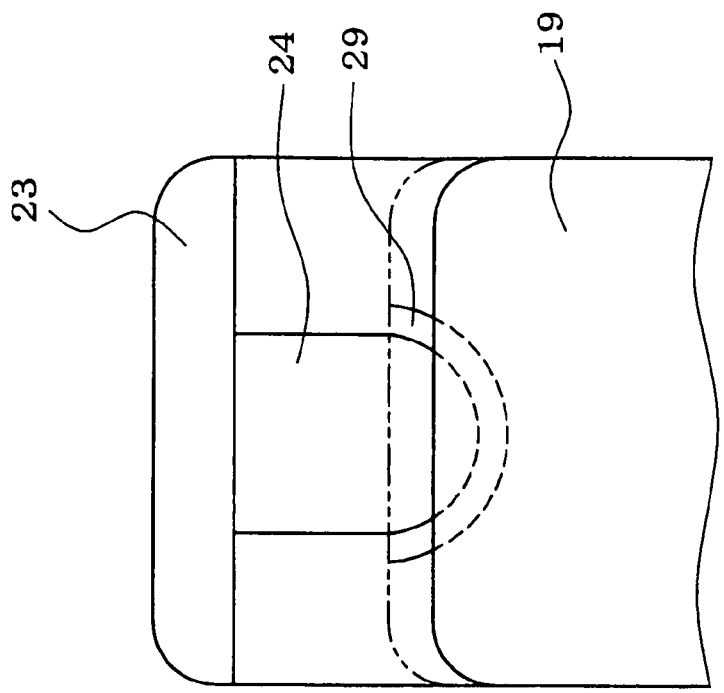

In the third embodiment, in order to eliminate the insensitive region, the entrance fringe of a cover wall 28 is slanted relative to the direction of the shaft 20 by θ, as shown in FIG. 12B. Other structures are the same as those of the second embodiment. The angle θ may be set to 15°-75°. By slanting the entrance fringe of the cover wall 28, the amount of intake air gradually changes according to rotation of the throttle valve even in the range where the upper end of the throttle valve 19 faces the entrance fringe of the cover wall 28. Alternatively, the entrance fringe of the cover wall 29 may be formed in an arc-shape, as shown in FIG. 13B. In this manner, the insensitive region can be eliminated. The arc-shape may be convex downward or concave upward, or it may be other shapes such a V-shape or a triangular shape. By making the entrance fringe of the cover wall slanted, curved or bent relative to the direction of the shaft 20, the insensitive region can be eliminated.

Figure 15:
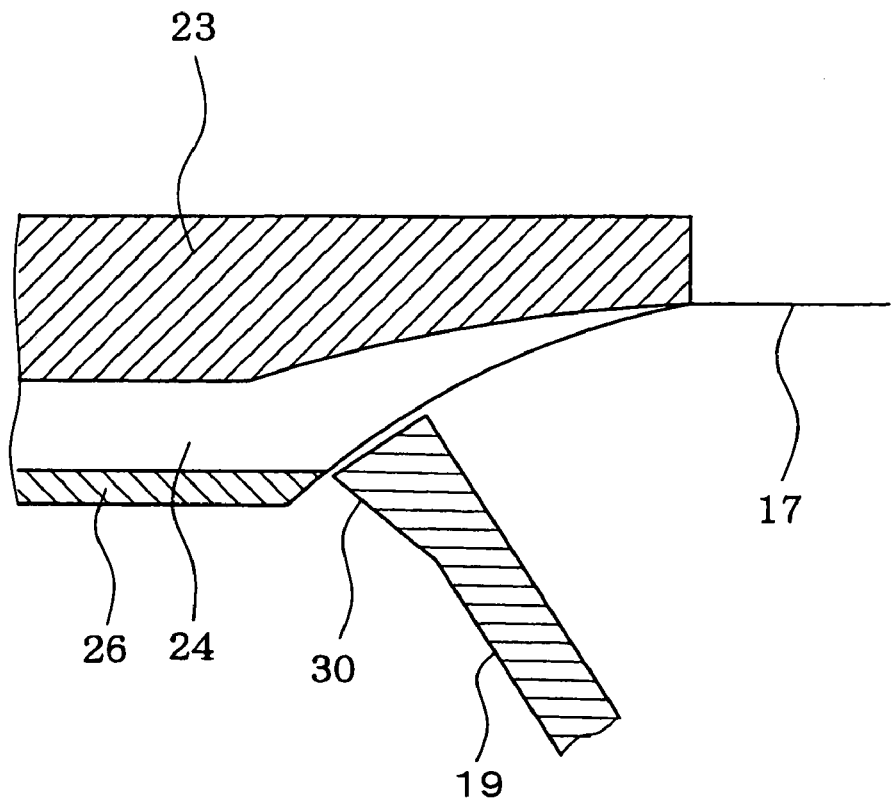
FIG. 15 is a cross-sectional view showing a throttle valve having a portion for preventing turnaround air, as a fourth embodiment of the present invention.

A fourth embodiment of the present invention will be described with reference to FIGS. 15 and 16. In this embodiment, a portion 30 for preventing turnaround air is formed on a downstream surface (rear surface) of the throttle valve 19, as shown in FIG. 15. Other structures are the same as those of the foregoing embodiments. Air may flow (turnaround) from an upstream surface (front surface) of the throttle valve 19 to the rear surface. Swirls may be developed by the turnaround air on the rear surface, causing a certain flow loss in the airflow passing through the passage 24. By forming the swollen portion 30 on the rear surface, turning around of the air is prevented or suppressed.

Figure 16:
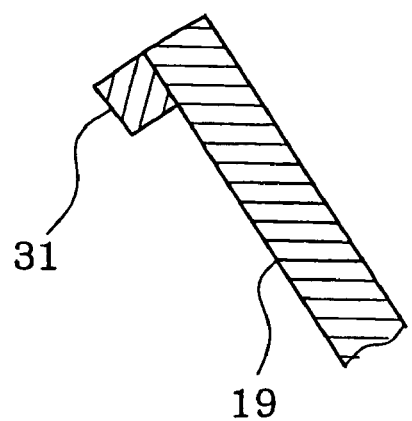
FIG. 16 is a cross-sectional view partially showing a throttle valve having a projected portion, as a modified form of the fourth embodiment.

In place of the swollen portion 30, a projected portion 31 may be formed on the rear surface, as shown in FIG. 16. The throttle valve 19 allows the intake air to flow only through the upper portion of the throttle valve 19, and the throttle valve is accommodated in the depressed portion 22 (as shown in FIG. 2) at its fully open position. Therefore, the swollen portion 30 or the projected portion 31 formed on the rear surface does not hinder the airflow passing through the air passage 18. Rather, the air supply efficiency at the fully open position is improved by preventing the swirls from being developed by the turnaround air on the rear surface.

Figure 17:
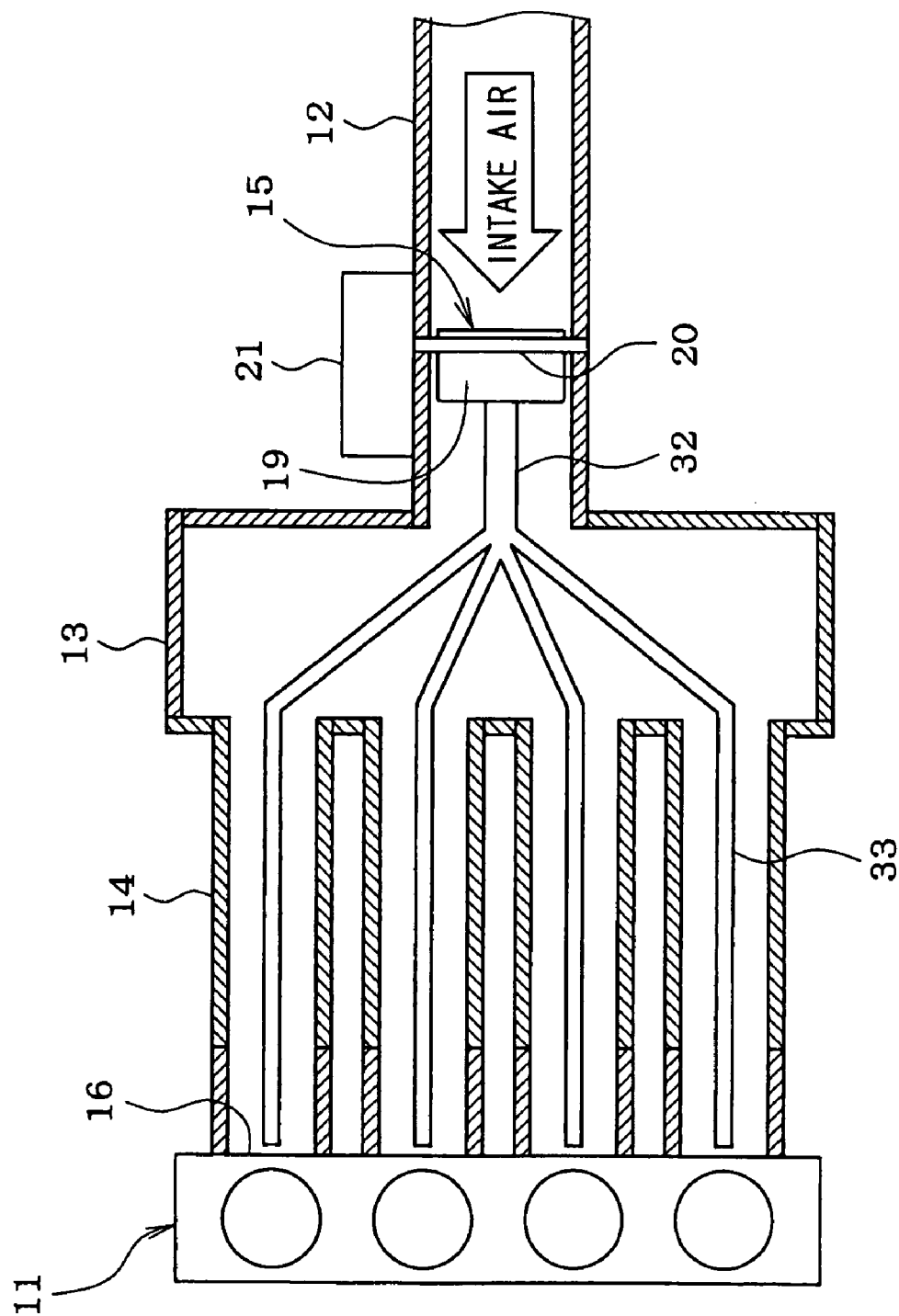
FIG. 17 is a cross-sectional view showing an entire structure of an air-intake device, as a fifth embodiment of the present invention.

A fifth embodiment of the present invention will be described with reference to FIG. 17. In the foregoing embodiments, the throttle valve unit 15 is installed in each pipe of the manifold 14 to supply intake air to each cylinder. In the fifth embodiment, a single throttle valve unit 15 common to all the cylinders is installed in the intake pipe 12, as shown in FIG. 17. A tunnel-shaped passage 32 is extended to a surge tank 13 and branched out to tunnel-shaped branch passages 33, each extending through the intake manifold to an intake port 16 of each cylinder. In this manner, the airflow generated in the tunnel-shaped passage 32 can be led into respective cylinders of the engine 11, while suppressing attenuation in the airflow.

The present invention is not limited to the embodiments described above, but it may be variously modified. For example, a throttle valve that is pivotally movable around an axis disposed at an upper end of the throttle valve may be used. The axis around which the throttle valve is pivotally movable may be disposed at an either side (left or right) of the throttle valve. Though the fuel is injected into the intake ports in the foregoing embodiments, it may be directly injected into cylinders of the engine.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An air-intake device for an internal combustion engine, comprising:
   a throttle valve, disposed in an intake air passage, for controlling an amount of air taken into the internal combustion engine, the throttle valve being hinged to the intake air passage to be pivotally movable around a shaft supporting one end of the throttle valve;
   an airflow passage, disposed downstream of the throttle valve, for rectifying an airflow therein and for promoting formation of a uniform air-fuel mixture in the internal combustion engine in a predetermined region of an opening-degree of the throttle valve, wherein:
   an open area of the airflow passage between the throttle valve and a member for forming the airflow passage is changed according to the opening-degree of the throttle valve in the predetermined region of the opening-degree of the throttle valve to thereby control an amount of intake air supplied to the internal combustion engine; and
   a width (W) of the open area of the airflow passage is narrower than a width of the intake air passage and constant in the predetermined region of the opening-degree of the throttle valve.

2. The air-intake device as in claim 1, wherein:
   the predetermined region of the opening-degree of the throttle valve corresponds to an amount of intake air supplied to the internal combustion engine, which is equal to or higher than an amount required in an idling operation for warming up the engine and equal to or lower than an amount required when the engine is operated for driving a vehicle at a constant high speed on a flat road.

3. An air-intake device for an internal combustion engine, comprising:
   a throttle valve, disposed in an intake air passage, for controlling an amount of air taken into the internal combustion engine, the throttle valve being hinged to the intake air passage to be pivotally movable around a shaft supporting one end of the throttle valve;
   an airflow passage, disposed downstream of the throttle valve, for rectifying an airflow therein and for promoting formation of a uniform air-fuel mixture in the internal combustion engine in a predetermined region of an opening-degree of the throttle valve, wherein:
   an open area of the airflow passage is changed according to the opening-degree of the throttle valve in the predetermined region of the opening-degree of the throttle valve to thereby control an amount of intake air supplied to the internal combustion engine, wherein:
   the airflow passage is formed in a tunnel-shape covered with a cover wall.

4. The air-intake device as in claim 3, wherein:
   the tunnel-shaped passage is branched out to a plurality of branch passages corresponding to the number of intake valves provided in each cylinder of the engine, so that an airflow flowing through each branch passage is directed to each intake valve of each cylinder.

5. The air-intake device as in claim 3, wherein:
   an outlet port of the tunnel-shaped passage is formed to suppress attenuation in a airflow supplied into a combustion chamber of the engine.

6. The air-intake device as in claim 3, wherein:
   an entrance fringe of the cover wall is inclined, curved or bent relative to the shaft of the throttle valve thereby to eliminate an insensitive region where an amount of intake air does not change according to changes in the opening-degree of the throttle valve.

7. The air-intake device as in claim 4, wherein:
   an outlet port of the tunnel-shaped branch passage is formed to suppress attenuation in a airflow supplied into a combustion chamber of the engine.

8. An air-intake device for an internal combustion engine, comprising:
- a throttle valve, disposed in an intake air passage, for controlling an amount of air taken into the internal combustion engine, the throttle valve being hinged to the intake air passage to be pivotally movable around a shaft supporting one end of the throttle valve;
- an airflow passage, disposed downstream of the throttle valve, for rectifying an airflow therein and for promoting formation of a uniform air-fuel mixture in the internal combustion engine in a predetermined region of an opening-degree of the throttle valve, wherein:
- an open area of the airflow passage is changed according to the opening-degree of the throttle valve in the predetermined region of the opening-degree of the throttle valve to thereby control an amount of intake air supplied to the internal combustion engine, wherein:
- a member for preventing an airflow turning around an upper end of the throttle valve from its upstream surface to its downstream surface is formed on the downstream surface to be projected therefrom.

9. The air-intake device as in claim 1, wherein:
- the airflow passage is formed by a member that is made separately from the intake air passage and the throttle valve.

* * * * *